(12) United States Patent
Sporn

(10) Patent No.: US 11,641,846 B2
(45) Date of Patent: May 9, 2023

(54) DOG HARNESS WITH BALL POUCH

(71) Applicant: Joseph S Sporn, New York, NY (US)

(72) Inventor: Joseph S Sporn, New York, NY (US)

(*) Notice: Subject to any disclaimer, the term of this patent is extended or adjusted under 35 U.S.C. 154(b) by 117 days.

(21) Appl. No.: 17/166,468

(22) Filed: Feb. 3, 2021

(65) Prior Publication Data
US 2022/0240490 A1 Aug. 4, 2022

(51) Int. Cl.
A01K 27/00 (2006.01)

(52) U.S. Cl.
CPC .......... *A01K 27/008* (2013.01); *A01K 27/002* (2013.01)

(58) Field of Classification Search
CPC ..... A01K 27/00; A01K 27/002; A01K 27/008
See application file for complete search history.

(56) References Cited

U.S. PATENT DOCUMENTS

| 6,568,575 | B1 | 5/2003 | Bartholomew | |
|---|---|---|---|---|
| 7,387,088 | B2 | 6/2008 | Sporn | |
| 7,497,186 | B2 | 3/2009 | Dorton | |
| 9,241,474 | B2 | 1/2016 | Thorn | |
| 2007/0034164 | A1* | 2/2007 | Sporn | A01K 27/002 119/856 |
| 2015/0296748 | A1* | 10/2015 | Sporn | A01K 15/02 119/863 |
| 2017/0215385 | A1 | 8/2017 | Hansen | |
| 2021/0127638 | A1* | 5/2021 | Kornegay | A01K 27/006 |
| 2021/0353017 | A1* | 11/2021 | Matiteyahu | A45F 5/02 |

* cited by examiner

*Primary Examiner* — Kristen C Hayes
(74) *Attorney, Agent, or Firm* — Messner Reeves LLP; Scott J. Hawranek

(57) ABSTRACT

A small animal harness comprising an elastically deformable forechest pouch for carrying a ball, snacks or other objects. The pouch is carried by a quadrilateral base member to which is attached a pair of flexible shoulder straps and a pair of flexible brisket straps whose ends converge over the animal's withers into a rigid connection plate so that the brisket straps are slidable within the plate and extend outwardly to be connected to a leash.

5 Claims, 5 Drawing Sheets

DOG HARNESS WITH BALL POUCH

The present invention relates to dog harnesses and in particular to such a harness with an integral pouch for carrying objects such as a small ball.

BACKGROUND OF THE INVENTION

Animal harnesses equipped with a pocket or pouch are not, per se, novel, as indicated by a selection of prior art patents and publications.

U.S. Pat. No. 7,497,186 discloses a self-carried hydrating system including a fluid pocket secured on an animal harness.

U.S. Pat. No. 9,241,474 teaches an animal harness having an attached pulsating device to calm an animal during transport.

U.S. Pat. No. 6,568,575 discloses an animal harness having detachable and interchangeable pouches that are best suited for a particular activity.

U.S. publication No. 2017/0215385 shows a dog harness having a waste holding bag on one side and a storage pouch on the other.

Unlike the harness pouches of the prior art, the object of the present invention is to provide a pouch which is integral with the forechest pad of a small animal harness and which is largely inconspicuous when not holding an object and is not a protrusive element of an animal harness, yet is readily available for loading an object.

SUMMARY OF THE INVENTION

The pouch carrying harness of the present invention comprises a quadrilateral forechest base similar to the chest piece disclosed in U.S. Pat. No. 7,387,088. The pouch is defined by a front elastic mesh panel superimposed over and attached to a back panel supported by the forechest base. The front mesh panel includes an elastic upper edge band which is expandable to allow receipt of an object within the pouch. A pair of spaced apart shoulder straps are attached to the upper edge of the forechest base and a pair of spaced apart brisket straps are attached to the lower edge of the base. The shoulder straps and brisket straps are interconnected over the animal's withers.

DETAILED DESCRIPTION OF PREFERRED EMBODIMENT

Figure 1:
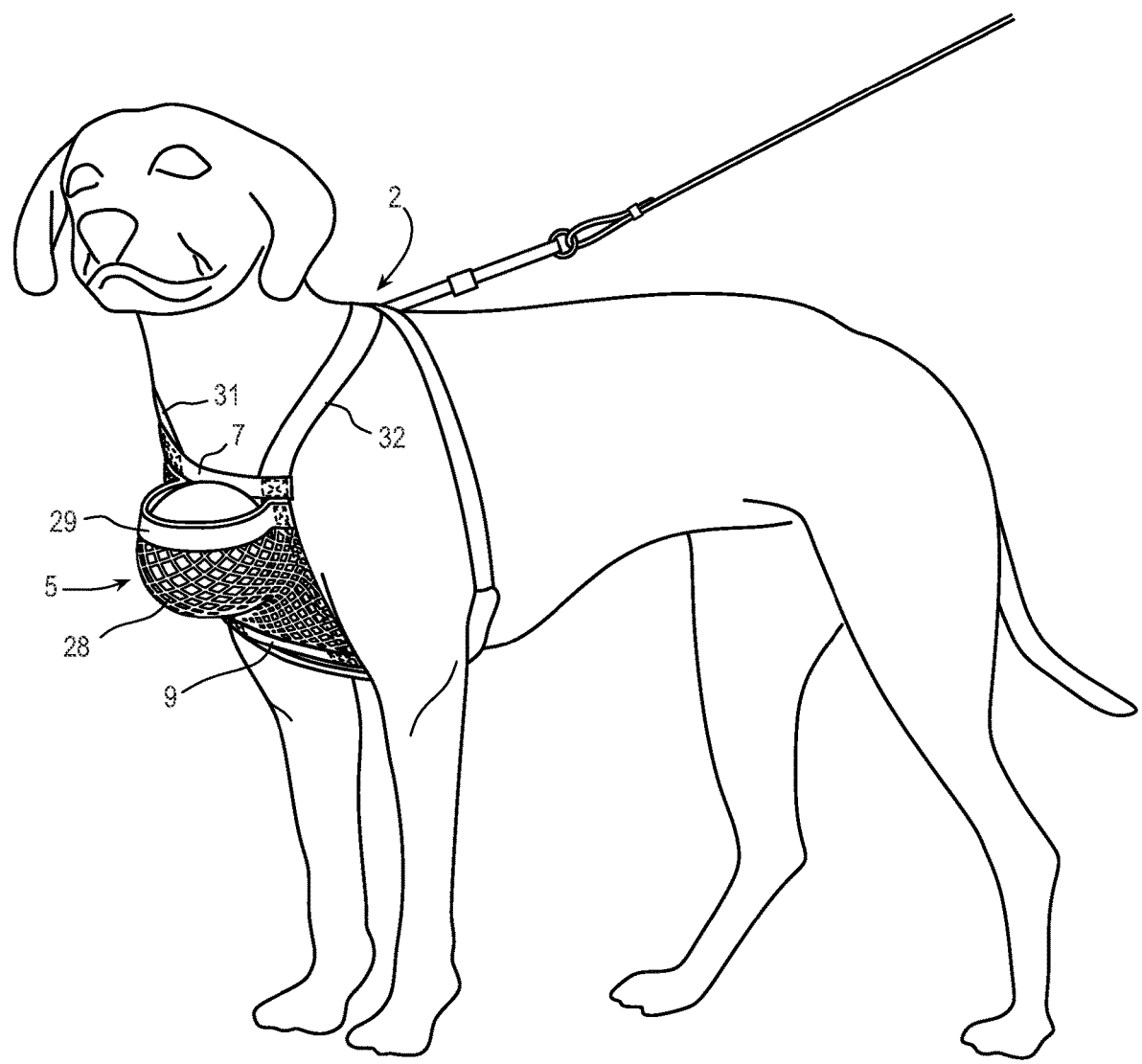
FIG. 1 is a perspective view of a dog wearing the pouch carrying harness of the present invention and showing a ball within the pouch.
Figure 4:
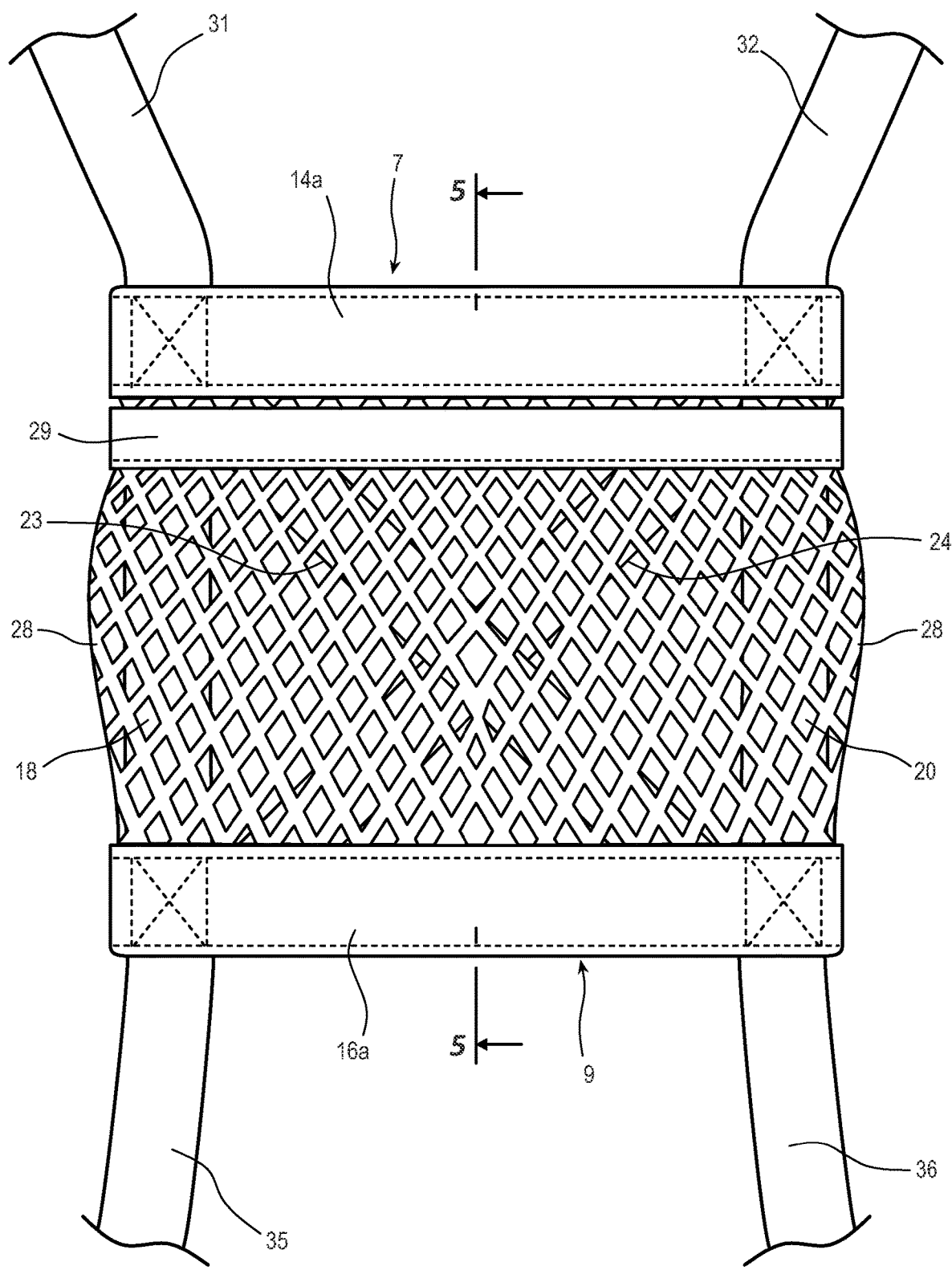
FIG. 4 is a front view of the pouch portion of the harness.
Figure 5:
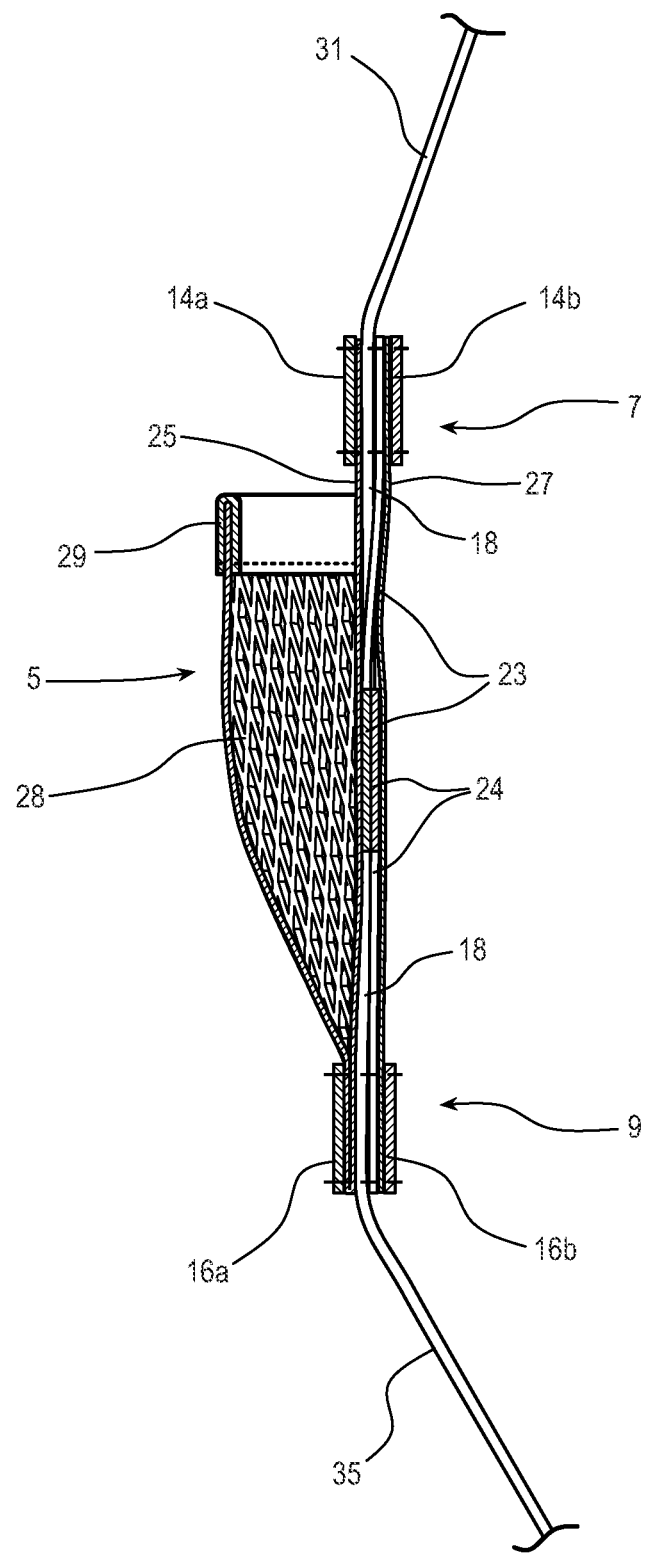
FIG. 5 is a cross section of the forechest base and pouch taken along lines 5-5 of FIG. 4.

A dog wearing the animal harness 2 of the present invention with a forechest ball pouch 5 is seen in FIG. 1. The pouch is carried by a quadrilateral harness base having an upper attachment strap 7, comprised by opposing plies 14a and 14b, and a vertically spaced apart lower attachment strap 9, having opposing plies 16a and 16b. The upper and lower attachment straps are interconnected by laterally spaced apart linking straps 18 and 20 (FIG. 4). The terminal ends of the linking straps are secured between the plies of the upper and lower attachment straps. Diagonal straps 23 and 24 are anchored at their respective terminal ends to the corners of the quadrilateral base by being secured between the plies 14a and 14b of the upper attachment strap 7 and between the plies 16a and 16b of the lower attachment strap 9.

The back side 23 of the pouch 5 comprises a pair of fabric panels 25 and 27 which together form a pocket enclosing the linking straps 18 and 20 and the diagonal straps 23 and 24 of the base. The top edges of the fabric panels are respectively secured between the plies 14a and 14b of the upper attachment strap 7 and the plies 16a and 16b of the lower attachment strap 9. The lateral edges of the panels are interconnected by sewing.

Figure 2:
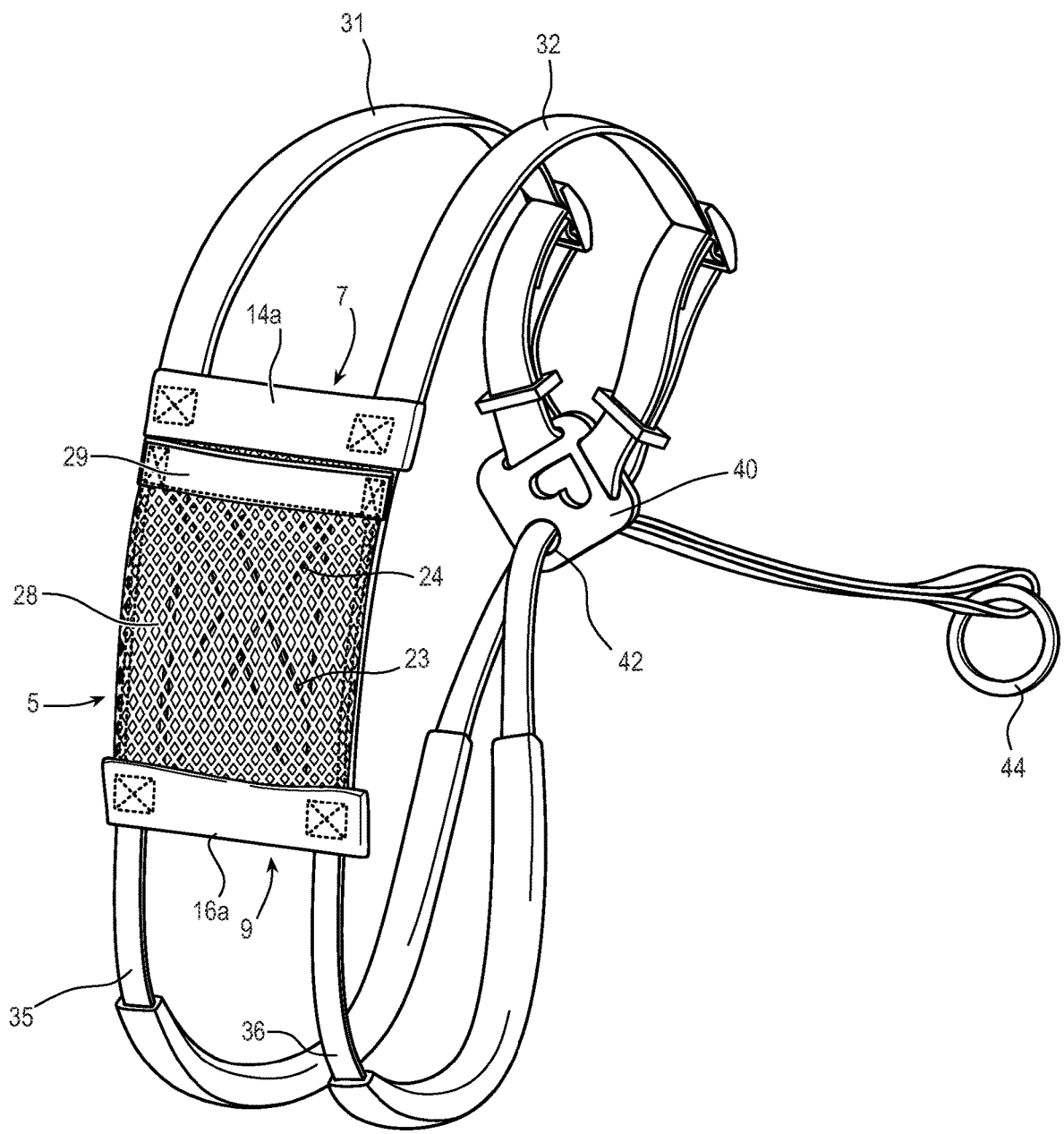
FIG. 2 is a perspective view of a harness having the pouch of the present invention mounted on the forechest base of the harness.
Figure 3:
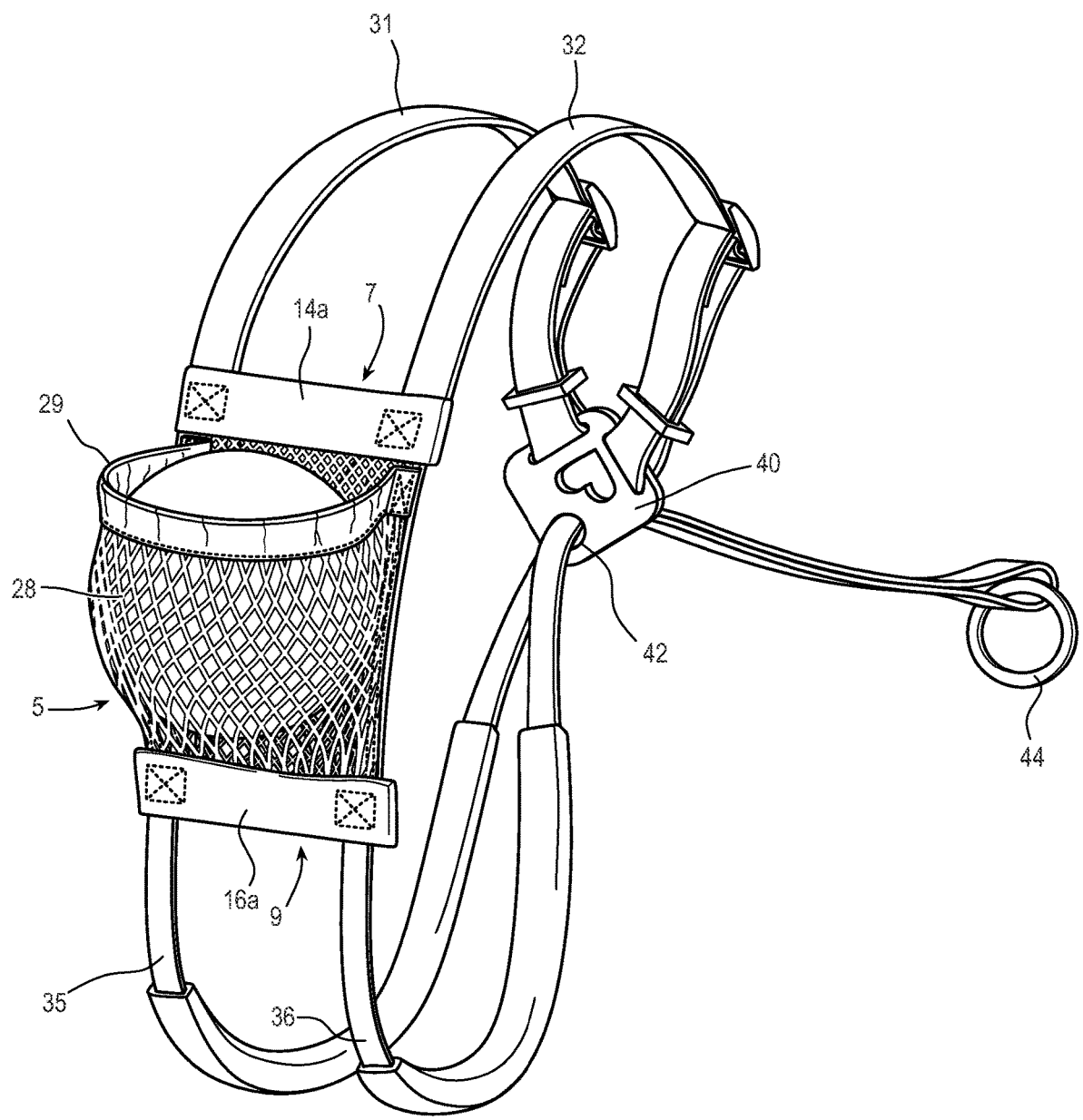
FIG. 3 is a perspective view similar to that of FIG. 2 except the pouch is shown with a ball within the pouch.

A mesh fabric shell 28 connected along its two lateral sides to the lateral sides of the back side panels 25 and 27, and whose bottom edge is secured between the plies 16a and 16b of the lower attachment strap 9, completes the structure of the pouch 5. The top edge of the shell 28 is hemmed by an elastic strip 29 which allows the mesh fabric of the shell to expand and receive an object, such as a ball, within the pouch, as shown in FIG. 3. When the object is removed from the pouch the elastic strip contracts, closing the spaces of the shell's mesh and bringing the shell to a retracted position over the back side 23 of the pouch, as illustrated in FIG. 2.

The quadrilateral base of the harness is retained on the dog by shoulder straps 31 and 32 and brisket straps 35 and 36 which converge in a flat plate 40 over the dogs' withers. The proximal ends of the shoulder straps are secured between the plies 14a and 14b of the upper attachment strap while the proximal ends of the brisket straps are secured between the plies 16a and 16b of the lower attachment strap 9. The shoulder straps are affixed to the plate 40 while the brisket straps are slidingly disposed in a hole 42 in the plate and extend beyond the plate to terminate in a leash attaching ring 44.

The plies of the attachment straps 7 and 9 are sewn together to interconnect and fasten together all of the straps and fabric pieces that are positioned between the plies.

I claim:

1. A small animal harness, comprising:
   a quadrilateral forechest base comprising:
      an upper attachment strap and a lower attachment strap spaced apart from the upper attachment strap;
      a right linking strap and a left linking strap spaced apart from the right linking strap, wherein the right linking strap and the left linking strap are configured to interconnect the upper attachment strap and lower attachment strap;
   a pouch comprising:
      a back panel affixed to the upper attachment strap, the lower attachment strap, the right linking strap and the left linking strap;
      a front mesh shell affixed to the lower attachment strap and the right linking strap and the left linking strap wherein the front mesh shell includes an upper edge having an attached elastic bordering strip;
   a pair of shoulder straps secured to the upper attachment strap;
   a pair of brisket straps secured to the lower attachment strap; and
   a mechanism configured to interconnect the pair of shoulder straps and the pair of brisket straps over withers of an animal.

2. A small animal harness, comprising:
a forechest pouch comprising:
   quadrilaterally interconnected framing straps;
   a rear panel supported by the framing straps;
   a front elastic panel having top, bottom and side edges where the bottom and side edges are affixed to the framing straps;
   an elastic hemming strip attached to the top edge of the front elastic panel;
a pair of shoulder straps attached to the framing straps;
a pair of brisket straps attached to the framing straps; and
a mechanism configured to interconnect the pair shoulder straps and the pair brisket straps over a portion of an animal.

3. The harness of claim 2, wherein the front elastic panel comprises a mesh material.

4. The harness of claim 3, wherein the rear panel comprises a mesh material.

5. A small animal harness, comprising,
an elastically deformable forechest pouch comprising a mesh panel having an elastic hemming strip attached to a top edge of the mesh panel;
a quadrilateral base member supporting the forechest pouch;
a connecting plate having an aperture and disposed for position over an animal's withers;
a pair of flexible shoulder straps having proximal and distal ends where the proximal ends are attached to the base member and the distal ends are connected to the connecting plate; and
a pair of flexible brisket straps having proximal and distal ends where the proximal ends are attached to the base member and the distal ends are slidably disposed in the aperture of the plate for connection to a leash.

* * * * *